(No Model.)  
N. JENKINS.  
SUSPENSION DEVICE.

No. 376,657. Patented Jan. 17, 1888.

Witnesses.
Robert Burritt,
Percy B. Hills.

Inventor:
Nicholas Jenkins.
By James L. Norris.
Atty.

(No Model.)
2 Sheets—Sheet 2.
N. JENKINS.
SUSPENSION DEVICE.
No. 376,657.  Patented Jan. 17, 1888.
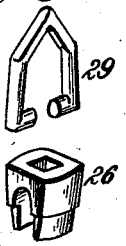
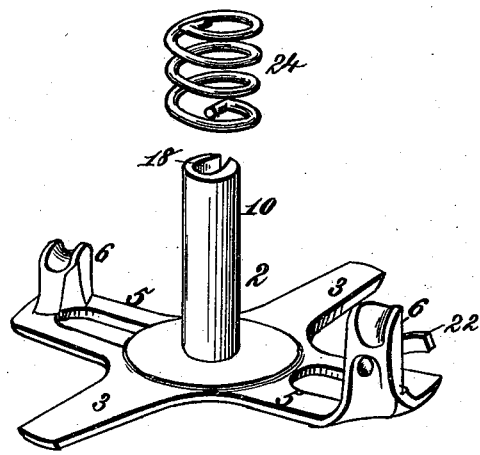
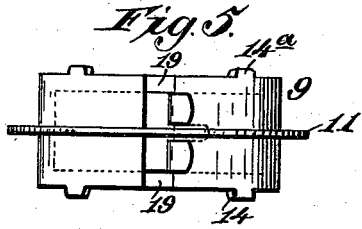
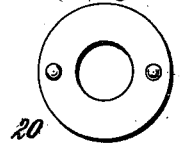
Witnesses,
Inventor
Nicholas Jenkins.
By James L. Norris,
Atty.

UNITED STATES PATENT OFFICE.

NICHOLAS JENKINS, OF WATERBURY, CONNECTICUT, ASSIGNOR TO HOLMES, BOOTH & HAYDENS, OF NEW YORK, N. Y.

SUSPENSION DEVICE.

SPECIFICATION forming part of Letters Patent No. 376,657, dated January 17, 1888.

Application filed April 28, 1887. Serial No. 236,496. (No model.)

*To all whom it may concern:*

Be it known that I, NICHOLAS JENKINS, a citizen of the United States, residing at Waterbury, in the county of New Haven and State of Connecticut, have invented new and useful Improvements in Suspension Devices, of which the following is a specification.

My invention relates to that class of suspension devices that are employed for suspending lamps or other articles at variable heights. The invention comprises a hinged loop or link for attaching the suspension devices to a fixed hook or like support, a locking device for holding the rotary chain-carrying drum immovable when desired, a spring-brake adapted to act on the top plate of the drum, and certain improvements in the construction and combinations of parts, as hereinafter more fully set forth and claimed.

The invention is illustrated in the annexed drawings, in which—

Figure 1:
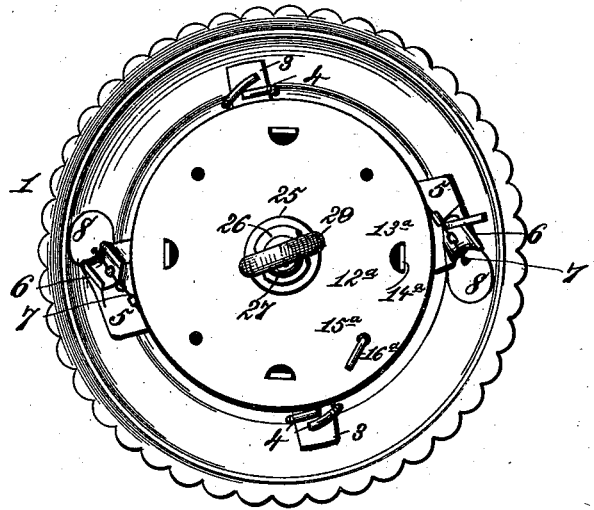
Figure 2:
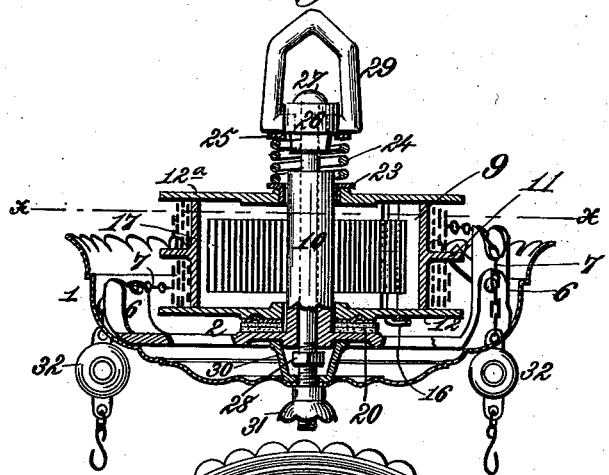
Figure 3:
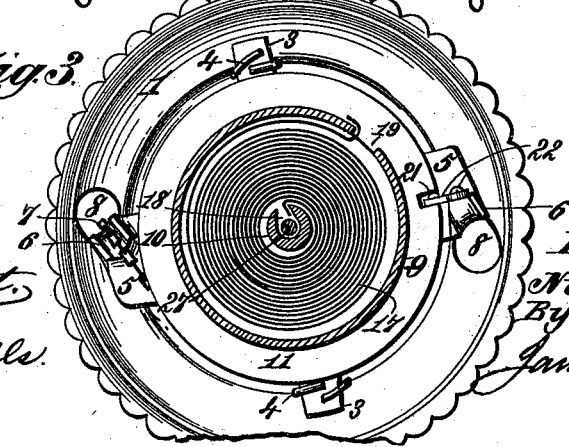

Figure 1 is a plan view of my improved automatic suspension device. Fig. 2 is a central vertical section. Fig. 3 is a horizontal section on the line $x\ x$ of Fig. 2. Fig. 4 represents a hollow arbor and its supporting-spider, with detached views of a spring and sleeve forming parts of the brake mechanism, and a bifurcated link for connecting the suspension devices with a support. Fig. 5 is a side view of the drum with top and bottom plates removed. Fig. 6 is a plan of bottom plate. Fig. 7 shows a plan and edge view of a washer placed beneath the drum. Fig. 8 is a bearing-block for the spider.

The reference-numeral 1 designates a metallic casing which incloses and supports the suspension devices. In this casing is placed a spider, 2, having, say, four radiating arms, two of which, as indicated by the numeral 3, are fastened down by clips or wires 4, secured in the casing. The spider also has arms 5, that are provided at their outer ends with guides 6 for the suspension cords or chains 7, which pass through adjacent openings 8 in the opposite sides of the casing. These chains 7 are wound on a rotary drum, 9, that surrounds a hollow arbor, 10, which is preferably integral with the spider, as shown, but may be formed separately. One chain is wound beneath a central flange, 11, that is formed on the drum, and the other chain is wound above said flange.

Beneath the drum is a disk or circular bottom plate, 12, having a series of openings, 13, that engage lugs 14 on the lower edge of the drum with which said bottom plate is thus connected. The disk or bottom plate, 12, also has perforations 15, with one of which is engaged a hook or link, 16, on the inner end of one of the suspension-chains. By providing several of these perforations 15 the chain can be secured to the drum at any desired point. Above the drum 9 is a similar disk or circular top plate, 12$^a$, having openings 13$^a$ for engaging lugs 14$^a$ on the upper edge of the drum, and perforations 15$^a$ for engaging a hook or link, 16$^a$, on the inner end of the other chain. Both chains and both disks are thus connected to and move with the drum. Inclosed in the drum 9 is a convolute counterbalance-spring, 17, the inner end of which is hooked and engaged in a vertical slot, 18, in one side of the hollow or tubular arbor 10, while the outer end of the spring is hooked and bifurcated to engage a double slot, 19, in the periphery of the drum. It will thus be seen that rotation of the drum in one direction will coil the spring closely, at the same time unwinding the chains on the outside of the drum, so that when released the tension of the coiled spring will rotate the drum in the opposite direction and wind the chains.

Between the spider 2 and the bottom plate, 12, of the drum is placed a series of washers, 20, surrounding the lower end of the tubular arbor. These washers may be of metal, leather, or rubber; or, preferably, one or more are metal and the others rubber, leather, or like material. In the construction shown the lower surface of the bottom plate, 12, is indented at two or more points near the center, and the upper thin metallic washer is attached to this plate by punching the thin metal into the indentations.

For the purpose of holding the drum immovable after the suspension-chains have been unwound and the spring coiled closely, and while the other parts of the mechanism hereinafter described are being adjusted, it is convenient to provide some means for locking the drum to prevent uncoiling the spring and winding the chains. This can be done in a simple and effective manner by forming a notch, 21, in the periphery of the drum-flange 11 and by pivoting a pawl or catch, 22, on the shank of one of the guides 6 in position to engage said notch after the drum has been rotated to unwind the chains and coil and wind the spring. This lock also enables the drum to be held in a fixed position, with the spring 17 more or less closely coiled, while the chains and other parts are being adjusted, so as to provide more or less power, as required for automatically adjusting a lamp or other article of varying weight when suspended from the chains.

Above the top plate, $12^a$, of the drum, and fitting around the upper part of the tubular and slotted arbor 10, is a sleeved washer, 23, on which rests the lower end of a strong spiral spring, 24, which has its lower end slightly hooked inward to interlock with the slot 18 in the arbor. On the upper end of this spring 24 is placed a flat washer, 25, which forms a bearing for a bilaterally-slotted sleeve, 26, the lower end of which is reduced in diameter sufficiently to be embraced by the upper end of the spiral spring. An ordinary carriage-bolt, 27, is passed through the sleeve 26, spring 24, washers 23 25, and hollow arbor 10, and is confined by a nut, 28, beneath the spider. Before the bolt 27 is engaged with the sleeve 26 and hollow arbor 10 a bifurcated or open-ended link, 29, is engaged loosely in the slotted sides of the sleeve 26, between the head of said sleeve and the washer 25, the link being thus hinged to the bolt and sleeve so as to turn freely on either side.

In putting the devices together it is advisable to first connect the spider, drum, and intermediate washers, at the same time engaging the convolute spring 17 with the drum and hollow arbor, then close the drum by placing its top plate in position, and adjust the washers 23 25, spring 24, sleeve 26, link 29, bolt 27, and nut 28. The drum can now be rotated to coil the spring 17 with any desired tension, after which the drum will be locked and the chains 7 attached to the top and bottom plates thereof before placing the drum in the casing.

Before securing the spider 2 within the casing 1 a chambered bearing-block, 30, is placed centrally in the bottom of the casing between it and the spider. This block 30 surrounds the nut 28, and is perforated for passage of the lower end of the bolt 27, which also passes through the bottom of the casing. An ornamental nut, 31, on the lower end of the bolt 27 serves to tighten or loosen said bolt together with the connected sleeve 26 and spring 24, so as to adjust the tension of the spring and cause the washers 20 and 23 to bear with greater or less force on the bottom and top of the drum, respectively. The washers 20 23 and spring 24, with their connections, as shown, thus form an adjustable spring friction-brake for the drum, through which the power of the drum-actuating spring 27 can be controlled to correspond with the counterbalancing-weight of the suspended article. In tightening the nut 31 any liability of crushing the thin metal of which the casing is composed will be prevented through the support given by the bearing-block 30 within the casing.

In adjusting the chains 7 to the drum an ornamental knob, 32, is attached to each chain in proper position to serve as a stop when the uncoiling of the spring 17 winds the chains on the drum. When the pawl 22 is disengaged from the notch 21, the drum 9 will be free to rotate under the action of the uncoiling spring 17, thereby winding the chains 7 onto the drum until the knobs or stops 32 come in contact with the edges of the openings 8 on the outside of the casing.

It will be observed that the hinged loop or link 29 by turning freely to either side will enable the suspension devices to be readily and conveniently attached to a hook in the ceiling of a room, the construction being such that by first turning the hinged loop to one side at an angle or nearly to a horizontal position the upper rim of the casing can be brought close to the ceiling in the act of engaging the loop with the hook from which the mechanism is to be suspended. After the casing 1 and its attached parts have been suspended a lamp or other article can be connected with the chains 7 either directly or through an intermediate balancing device in any well-known manner. The weight of the lamp or other article will draw on the chains 7 to unwind them from the drum 9, the rotation of which in unwinding the chains will coil the spring 17 more closely, to furnish power for rotating the drum in the opposite direction, and winding the chains when the weight is diminished or when the lamp or other article is slightly raised by hand. If the tension of the spring 17 is properly proportioned to the weight of the lamp or other suspended article, the latter can therefore be automatically adjusted with ease to any desired height and maintained in the required position.

In raising the lamp or other article the rotation of the drum 9 under the uncoiling action of the spring 17 will be retarded by the friction on the top plate, $12^a$, exerted by the spiral spring 24 and sleeved washer 23, and also by the washers 20 against the bottom plate, 12, said parts thus serving as a brake to prevent a sudden or too rapid winding of the chains with consequent jar and injury to the lamp. By tightening or loosening the nut 28 on the lower threaded end of the bolt 27 the spring-brake can be adjusted to exert a greater or less friction on the drum.

The various parts of the mechanism are readily detachable to facilitate readjustment or removal of parts when required.

What I claim as my invention is—

1. In an automatic suspension device, the combination of a casing and an inclosed suspension mechanism comprising a hollow arbor, a slotted sleeve, a bolt passed through said arbor and sleeve, and a loop hinged or pivoted in the slots of the sleeve beneath the head of the bolt and adapted to engage a hook, substantially as described.

2. In an automatic suspension device, the combination of a rotary drum, a hollow arbor, a bolt passed through said arbor, a spiral spring surrounding the upper part of the bolt and engaged with the upper end of the said arbor, a bilaterally-slotted sleeve, and a hinged loop engaged in the slots of said sleeve beneath the head of the bolt, substantially as described.

3. In an automatic suspension device, the combination of a casing, a rotary drum, a spider having a hollow arbor for said drum, a bolt passed through said arbor and casing, a nut on the bolt beneath the spider, a bearing-block surrounding said bolt and nut between the casing and spider, and a nut on the end of the bolt beneath the casing, substantially as described.

4. In an automatic suspension device, the combination of the rotary drum 9, having a detachable top plate, the hollow arbor 10, having a slot, 18, the springs 17 and 24, engaged in said slot, the bolt 27, the sleeved washer 23, flat washer 25, sleeve 26, and hinged loop 29, substantially as described.

5. In an automatic suspension device, the combination of the casing 1, spring-drum 9, hollow arbor 10, a spider, 2, a bolt, 27, passing through the hollow arbor and casing and having a screw-threaded lower end, a hinged loop, 29, connected with the upper end of said bolt, the washers 20 and 23, bearing upon the upper and lower sides of the drum, a spring, 24, bearing against the upper washer, a washer, 25, between the hinged loop and the upper end of the spring 24, a bearing-block, 30, located in the casing and supporting the spider, and a nut, 31, bearing against the under side of the casing below said block and adjustable on the lower end of the bolt, substantially as described.

In testimony whereof I affix my signature in presence of two witnesses.

NICHOLAS JENKINS.

Witnesses:
H. H. WALKER,
CLIFFORD J. HACKETT.